US011032670B1

(12) United States Patent
Baylin et al.

(10) Patent No.: US 11,032,670 B1
(45) Date of Patent: Jun. 8, 2021

(54) DESTINATION SHARING IN LOCATION SHARING SYSTEM

(71) Applicant: Snap Inc., Santa Monica, CA (US)

(72) Inventors: Benoît Baylin, Paris (FR); Nicolas Dancie, Montreuil (FR); Antoine Martin, Paris (FR); Julien Martin, Domont (FR); Antoine Sinton, Courteuil (FR); Steven Uzan, Paris (FR)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/453,690

(22) Filed: Jun. 26, 2019

Related U.S. Application Data

(60) Provisional application No. 62/792,251, filed on Jan. 14, 2019.

(51) Int. Cl.
*H04W 4/029* (2018.01)
*H04W 4/024* (2018.01)
*G01C 21/34* (2006.01)
*H04W 8/18* (2009.01)
*G06F 3/0482* (2013.01)
*H04W 64/00* (2009.01)
*H04W 12/63* (2021.01)

(52) U.S. Cl.
CPC ........ *H04W 4/029* (2018.02); *G01C 21/3438* (2013.01); *G06F 3/0482* (2013.01); *H04W 4/024* (2018.02); *H04W 8/18* (2013.01); *H04W 12/63* (2021.01); *H04W 64/006* (2013.01)

(58) Field of Classification Search
CPC . H04W 4/00–029; H04W 4/185; H04W 4/21; H04W 4/30–38; H04W 8/18–22; H04W 12/00503; G01C 21/3438; G06F 3/0482
See application file for complete search history.

(56) References Cited

U.S. PATENT DOCUMENTS

| 5,880,731 A | 3/1999 | Liles et al. |
| 6,023,270 A | 2/2000 | Brush, II et al. |
| 6,223,165 B1 | 4/2001 | Lauffer |

(Continued)

FOREIGN PATENT DOCUMENTS

| CN | 109863532 A | 6/2019 |
| CN | 110168478 A | 8/2019 |

(Continued)

*Primary Examiner* — San Htun
(74) *Attorney, Agent, or Firm* — Schwegman Lundberg & Woessner, P.A.

(57) ABSTRACT

Methods, systems, and devices are described for predicting a destination of a user and sharing the presumed destination with the other users via a geographically-based graphical user interface. Consistent with some embodiments, an electronic communication containing location information is received from a location sensor coupled to a first client device. A current trajectory of the first user is determined based on the location information. A presumed destination of the first user is determined, by correlating the current trajectory of the first user with historical location information of the first user. A map depicting an icon associated with the presumed destination of the first user is displayed, on a display screen of a second client device of a second user.

16 Claims, 12 Drawing Sheets

(56) References Cited

U.S. PATENT DOCUMENTS

| | | |
|---|---|---|
| 6,772,195 B1 | 8/2004 | Hatlelid et al. |
| 6,842,779 B1 | 1/2005 | Nishizawa |
| 7,342,587 B2 | 3/2008 | Danzig et al. |
| 7,468,729 B1 | 12/2008 | Levinson |
| 7,636,755 B2 | 12/2009 | Blattner et al. |
| 7,639,251 B2 | 12/2009 | Gu et al. |
| 7,775,885 B2 | 8/2010 | Van Luchene et al. |
| 7,859,551 B2 | 12/2010 | Bulman et al. |
| 7,885,931 B2 | 2/2011 | Seo et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,146,005 B2 | 3/2012 | Jones et al. |
| 8,151,191 B2 | 4/2012 | Nicol |
| 8,384,719 B2 | 2/2013 | Reville et al. |
| RE44,054 E | 3/2013 | Kim |
| 8,396,708 B2 | 3/2013 | Park et al. |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,597,121 B2 | 12/2013 | Andres Del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,890,926 B2 | 11/2014 | Tandon et al. |
| 8,892,999 B2 | 11/2014 | Nims et al. |
| 8,924,250 B2 | 12/2014 | Bates et al. |
| 8,963,926 B2 | 2/2015 | Brown et al. |
| 8,989,786 B2 | 3/2015 | Feghali |
| 9,086,776 B2 | 7/2015 | Ye et al. |
| 9,105,014 B2 | 8/2015 | Collet et al. |
| 9,241,184 B2 | 1/2016 | Weerasinghe |
| 9,256,860 B2 | 2/2016 | Herger et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,460,541 B2 | 10/2016 | Li et al. |
| 9,489,760 B2 | 11/2016 | Li et al. |
| 9,503,845 B2 | 11/2016 | Vincent |
| 9,508,197 B2 | 11/2016 | Quinn et al. |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,648,376 B2 | 5/2017 | Chang et al. |
| 9,697,635 B2 | 7/2017 | Quinn et al. |
| 9,706,040 B2 | 7/2017 | Kadirvel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,362,219 B2 | 7/2019 | Wilson et al. |
| 10,475,225 B2 | 11/2019 | Park et al. |
| 10,504,266 B2 | 12/2019 | Blattner et al. |
| 10,573,048 B2 | 2/2020 | Ni et al. |
| 10,657,701 B2 | 5/2020 | Osman et al. |
| 2002/0067362 A1 | 6/2002 | Agostino Nocera et al. |
| 2002/0169644 A1 | 11/2002 | Greene |
| 2005/0162419 A1 | 7/2005 | Kim et al. |
| 2005/0206610 A1 | 9/2005 | Cordelli |
| 2006/0294465 A1 | 12/2006 | Ronen et al. |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2008/0158222 A1 | 7/2008 | Li et al. |
| 2009/0016617 A1 | 1/2009 | Bregman-amitai et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2009/0319172 A1* | 12/2009 | Almeida ............. G01C 21/20 701/533 |
| 2010/0011422 A1 | 1/2010 | Mason et al. |
| 2010/0014443 A1* | 1/2010 | Cristian ............. G01S 5/0289 370/255 |
| 2010/0023885 A1 | 1/2010 | Reville et al. |
| 2010/0115426 A1 | 5/2010 | Liu et al. |
| 2010/0162149 A1 | 6/2010 | Sheleheda et al. |
| 2010/0203968 A1 | 8/2010 | Gill et al. |
| 2010/0227682 A1 | 9/2010 | Reville et al. |
| 2011/0093780 A1 | 4/2011 | Dunn |
| 2011/0115798 A1 | 5/2011 | Nayar et al. |
| 2011/0148864 A1 | 6/2011 | Lee et al. |
| 2011/0208425 A1* | 8/2011 | Zheng ............. G01S 19/14 701/532 |
| 2011/0239136 A1 | 9/2011 | Goldman et al. |
| 2012/0113106 A1 | 5/2012 | Choi et al. |
| 2012/0124458 A1 | 5/2012 | Cruzada |
| 2012/0130717 A1 | 5/2012 | Xu et al. |
| 2012/0239584 A1* | 9/2012 | Yariv ............. G01C 21/3438 705/319 |
| 2013/0103760 A1 | 4/2013 | Golding et al. |
| 2013/0201187 A1 | 8/2013 | Tong et al. |
| 2013/0249948 A1 | 9/2013 | Reitan |
| 2013/0257877 A1 | 10/2013 | Davis |
| 2013/0345961 A1* | 12/2013 | Leader ............. G01C 21/20 701/410 |
| 2014/0024354 A1* | 1/2014 | Haik ............. H04W 52/0251 455/418 |
| 2014/0043329 A1 | 2/2014 | Wang et al. |
| 2014/0055554 A1 | 2/2014 | Du et al. |
| 2014/0125678 A1 | 5/2014 | Wang et al. |
| 2014/0129343 A1 | 5/2014 | Finster et al. |
| 2015/0185030 A1* | 7/2015 | Monroe ............. G01C 21/3438 701/532 |
| 2015/0206349 A1 | 7/2015 | Rosenthal et al. |
| 2016/0134840 A1 | 5/2016 | Mcculloch |
| 2016/0234149 A1 | 8/2016 | Tsuda et al. |

(56) References Cited

U.S. PATENT DOCUMENTS

| | | |
|---|---|---|
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0199855 A1 | 7/2017 | Fishbeck |
| 2017/0235848 A1 | 8/2017 | Van Deusen et al. |
| 2017/0310934 A1 | 10/2017 | Du et al. |
| 2017/0312634 A1 | 11/2017 | Ledoux et al. |
| 2018/0047200 A1 | 2/2018 | O'hara et al. |
| 2018/0113587 A1 | 4/2018 | Allen et al. |
| 2018/0115503 A1 | 4/2018 | Baldwin et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2019/0001223 A1 | 1/2019 | Blackstock et al. |
| 2019/0057616 A1 | 2/2019 | Cohen et al. |
| 2019/0188920 A1 | 6/2019 | Mcphee et al. |

FOREIGN PATENT DOCUMENTS

| | | |
|---|---|---|
| EP | 2184092 A2 | 5/2010 |
| JP | 2001230801 A | 8/2001 |
| JP | 5497931 B2 | 3/2014 |
| KR | 101445263 B1 | 9/2014 |
| WO | WO-2003094072 A1 | 11/2003 |
| WO | WO-2004095308 A1 | 11/2004 |
| WO | WO-2006107182 A1 | 10/2006 |
| WO | WO-2007134402 A1 | 11/2007 |
| WO | WO-2012139276 A1 | 10/2012 |
| WO | WO-2013027893 A1 | 2/2013 |
| WO | WO-2013152454 A1 | 10/2013 |
| WO | WO-2013166588 A1 | 11/2013 |
| WO | WO-2014031899 A1 | 2/2014 |
| WO | WO-2014194439 A1 | 12/2014 |
| WO | WO-2016090605 A1 | 6/2016 |
| WO | WO-2018081013 A1 | 5/2018 |
| WO | WO-2018102562 A1 | 6/2018 |
| WO | WO-2018129531 A1 | 7/2018 |
| WO | WO-2019089613 A1 | 5/2019 |

\* cited by examiner

DESTINATION SHARING IN LOCATION SHARING SYSTEM

PRIORITY

This application claims the benefit of priority of U.S. Provisional Application Ser. No. 62/792,251, filed on Jan. 14, 2019, which is hereby incorporated by reference herein in its entirety.

BACKGROUND

The popularity of location sharing, particularly real-time location sharing, used in conjunction with a social networking application continues to grow. Users increasingly share their location with each other, providing challenges to social networking systems seeking to help their members share their location. Embodiments of the present disclosure address these and other issues.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Embodiments of the present disclosure provide a geographically-based graphical user interface (GUI). This user interface may be referred to herein as a "map GUI," and may be used in conjunction with a social media application. In some embodiments, the map GUI may include representations of at least approximate respective positions of a user and a user's friends in a social network graph accessed by the social media application using avatars for each respective user.

Various embodiments of the present disclosure provide systems, methods, techniques, instruction sequences, and computing machine program products for predicting a destination of a user. Some embodiments share the presumed destination with the user's friends via the map GUI. Some embodiments may additionally provide an estimated time of arrival at the presumed destination.

In some embodiments, the social network system receives, from a first client device of the user, via a wireless communication over a network, an electronic communication containing location information from a location sensor coupled to the first client device. The system then determines, based on the location information, a current trajectory of the user. The system accesses, from a database, historical location information of the user, and determines, by correlating the current trajectory of the user and the historical location information of the user, a presumed destination of the user. The system then displays, on display screens of client devices of the user's friends, a map depicting an icon associated with the presumed destination of the user, the location of the icon on the map being representative of the location of the presumed destination of the user.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Figure 1:
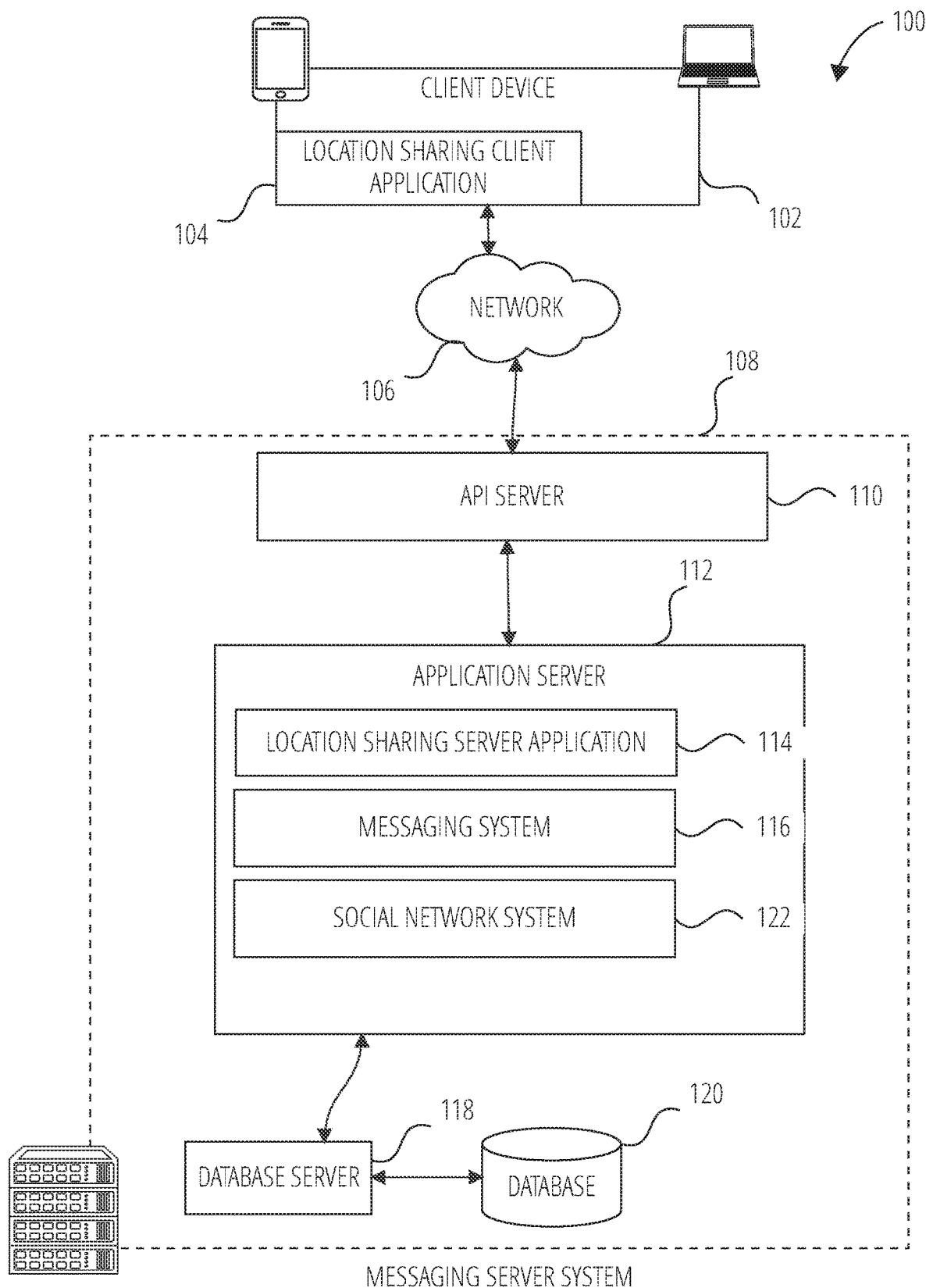
FIG. 1 is a diagrammatic representation of a networked environment in which the present disclosure may be deployed, in accordance with some example embodiments.

FIG. 1 is a block diagram showing an example location sharing system 100 for exchanging location data over a network. The location sharing system 100 includes multiple instances of a client device 102, each of which hosts a number of applications including a location sharing client application 104. Each location sharing client application 104 is communicatively coupled to other instances of the location sharing client application 104 and a location sharing server system 108 via a network 106 (e.g., the Internet).

A location sharing client application 104 is able to communicate and exchange data with another location sharing client application 104 and with the location sharing server system 108 via the network 106. The data exchanged between location sharing client application 104, and between a location sharing client application 104 and the location sharing server system 108, includes functions (e.g., commands to invoke functions) as well as payload data (e.g., location data, text, audio, video or other multimedia data).

The location sharing server system 108 provides server-side functionality via the network 106 to a particular location sharing client application 104. While certain functions of the location sharing system 100 are described herein as being performed by either a location sharing client application 104 or by the location sharing server system 108, the location of certain functionality either within the location sharing client application 104 or the location sharing server system 108 is a design choice. For example, it may be technically preferable to initially deploy certain technology and functionality within the location sharing server system 108, but to later migrate this technology and functionality to the location sharing client application 104 where a client device 102 has a sufficient processing capacity.

The location sharing server system 108 supports various services and operations that are provided to the location sharing client application 104. Such operations include transmitting data to, receiving data from, and processing data generated by the location sharing client application 104. This data may include, geolocation information, message content, client device information, media annotation and overlays, message content persistence conditions, social network information, and live event information, as examples. Data exchanges within the location sharing system 100 are invoked and controlled through functions available via user interfaces (UIs) of the location sharing client application 104.

Turning now specifically to the location sharing server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

The Application Program Interface (API) server 110 receives and transmits message data (e.g., commands and message payloads) between the client device 102 and the application server 112. Specifically, the Application Program Interface (API) server 110 provides a set of interfaces (e.g., routines and protocols) that can be called or queried by the location sharing client application 104 in order to invoke functionality of the application server 112. The Application Program Interface (API) server 110 exposes various functions supported by the application server 112, including account registration, login functionality, the sending of messages, via the application server 112, from a particular location sharing client application 104 to another location sharing client application 104, the sending of media files (e.g., images or video) from a location sharing client application 104 to the location sharing server application 114, and for possible access by another location sharing client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, and opening an application event (e.g., relating to the location sharing client application 104).

The application server 112 hosts a number of applications and subsystems, including a location sharing server application 114, a messaging system 116 and a social network system 122.

Examples of functions and services supported by the location sharing server application 114 include generating a map GUI. In some embodiments, the map GUI may include representations of at least approximate respective positions of a user and a user's friends in a social network graph accessed by the social media application using avatars for each respective user.

The location sharing server application 114 may receive user authorization to use, or refrain from using, the user's location information. In some embodiments, the location sharing server application 114 may likewise opt to share or not share the user's location with others via the map GUI. In some cases, the user's avatar may be displayed to the user on the display screen of the user's computing device regardless of whether the user is sharing his or her location with other users.

In some embodiments, a user can select groups of other users to which his/her location will be displayed, and may in specify different display attributes for the different respective groups or for different respective individuals. In one example, audience options include: "Best Friends," "Friends," and "Custom" (which is an individual-level whitelist of people). In this example, if "Friends" are selected, all new people added to the user's friends list will automatically be able to see their location. If they are already sharing with the user, their avatars will appear on the user's map.

In some embodiments, when viewing the map GUI, the user is able to see the location of all his/her friends that have shared their location with the user on the map, each friend represented by their respective avatar. In some embodiments, if the friend does not have an avatar, the friend may be represented using a profile picture or a default icon displayed at the corresponding location for the friend.

In some embodiments, the user can select between friends on the map via a menu, such as a carousel. In some embodiments, selecting a particular friend automatically centers the map view on the avatar of that friend. Embodiments of the present disclosure may also allow the user to take a variety of actions with the user's friends from within the map GUI. For example, the system may allow the user to chat with the user's friends without leaving the map. In one particular example, the user may select a chat icon from a menu presented in conjunction with the map GUI to initiate a chat session.

The messaging system 116 implements a number of message processing technologies and functions, particularly related to the aggregation and other processing of content (e.g., textual and multimedia content) included in messages received from multiple instances of the location sharing client application 104. As will be described in further detail, the text and media content from multiple sources may be aggregated into collections of content (e.g., called stories or galleries). These collections are then made available, by the location sharing server application 114, to the location sharing client application 104. Other processor and memory intensive processing of data may also be performed server-side by the location sharing server application 114, in view of the hardware requirements for such processing.

The application server 112 is communicatively coupled to a database server 118, which facilitates access to a database 120 in which is stored data processed by the location sharing server application 114.

Figure 2:
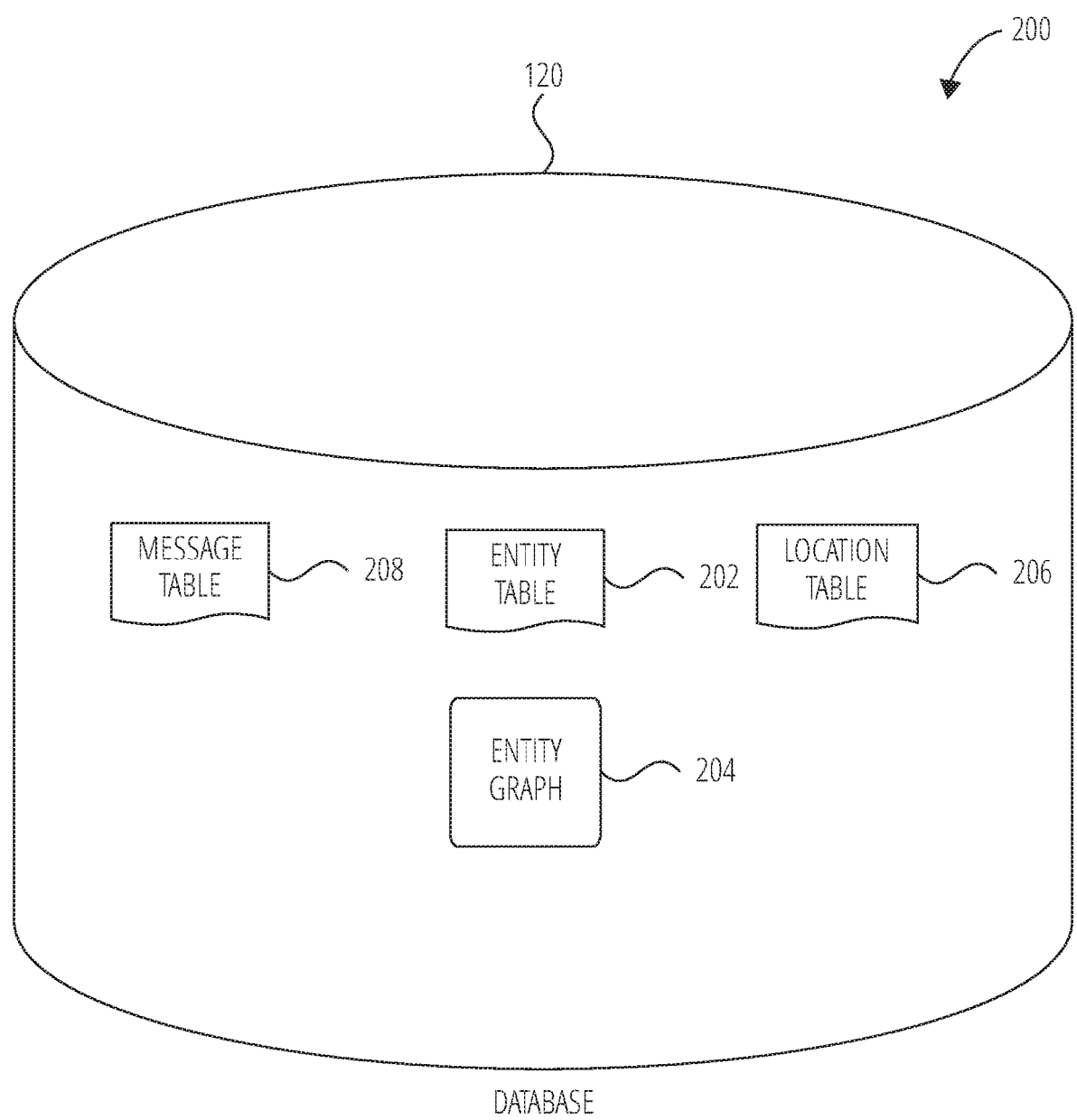
FIG. 2 is a diagrammatic representation of a data structure as maintained in a database, in accordance with some example embodiments.

The social network system 122 supports various social networking functions services, and makes these functions and services available to the location sharing server application 114. To this end, the social network system 122 maintains and accesses an entity graph 204 (as shown in FIG. 2) within the database 120. Examples of functions and services supported by the social network system 122 include the identification of other users of the location sharing system 100 with which a particular user has relationships or is "following", and also the identification of other entities and interests of a particular user.

FIG. 2 is a schematic diagram illustrating data structures 200 which may be stored in the database 120 of the location sharing server system 108, according to certain example embodiments. While the content of the database 120 is shown to comprise a number of tables, it will be appreciated that the data could be stored in other types of data structures (e.g., as an object-oriented database).

The database 120 includes message data stored within a message table 208. An entity table 202 stores entity data, including an entity graph 204. Entities for which records are maintained within the entity table 202 may include individuals (e.g., users), corporate entities, organizations, objects, places, events, etc. Regardless of type, any entity regarding which the location sharing server system 108 stores data may be a recognized entity. Each entity is provided with a unique identifier, as well as an entity type identifier (not shown). The entity graph 204 furthermore stores information regarding relationships and associations between entities. Such relationships may be social, professional (e.g., work at a common corporation or organization) interested-based or activity-based, merely for example. A location table 206 stores location information of users (e.g., geolocation information determined by the position components 538 of the client device 102). Location information may include a plurality of location points defined by at least a set of geographical coordinates and a time stamp.

Figure 3:
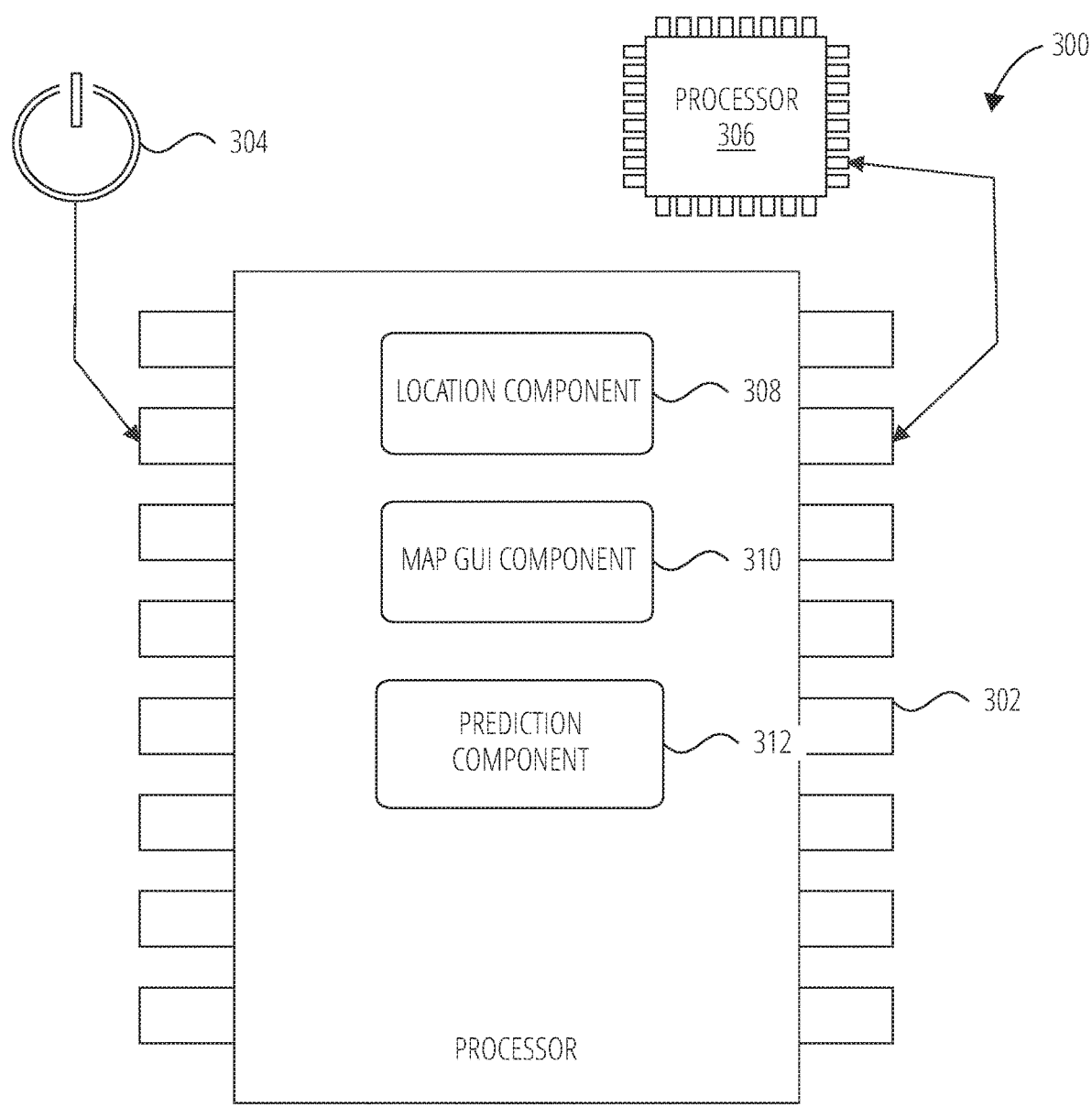
FIG. 3 is a diagrammatic representation of a processing environment, in accordance with some example embodiments.

Turning now to FIG. 3, there is shown a diagrammatic representation of a processing environment 300, which includes at least a processor 302 (e.g., a GPU, CPU or combination thereof).

The processor 302 is shown to be coupled to a power source 304, and to include (either permanently configured or temporarily instantiated) modules, namely a location component 308, a historical location component 314, a prediction component 312, and a map GUI component 310. The location component 308 operationally determines location of users based on location information. The location component 308 generates historical location information of a user by consolidating location information collected over time from one or more client device (e.g., client device 102) associated with the user. The prediction component 312 generates predictions regarding the presumed destination of a user. The map GUI component 310 operationally generates user interfaces and causes the user interfaces to be displayed on client devices. As illustrated, the processor 302 may be communicatively coupled to another processor 306.

Figure 4:
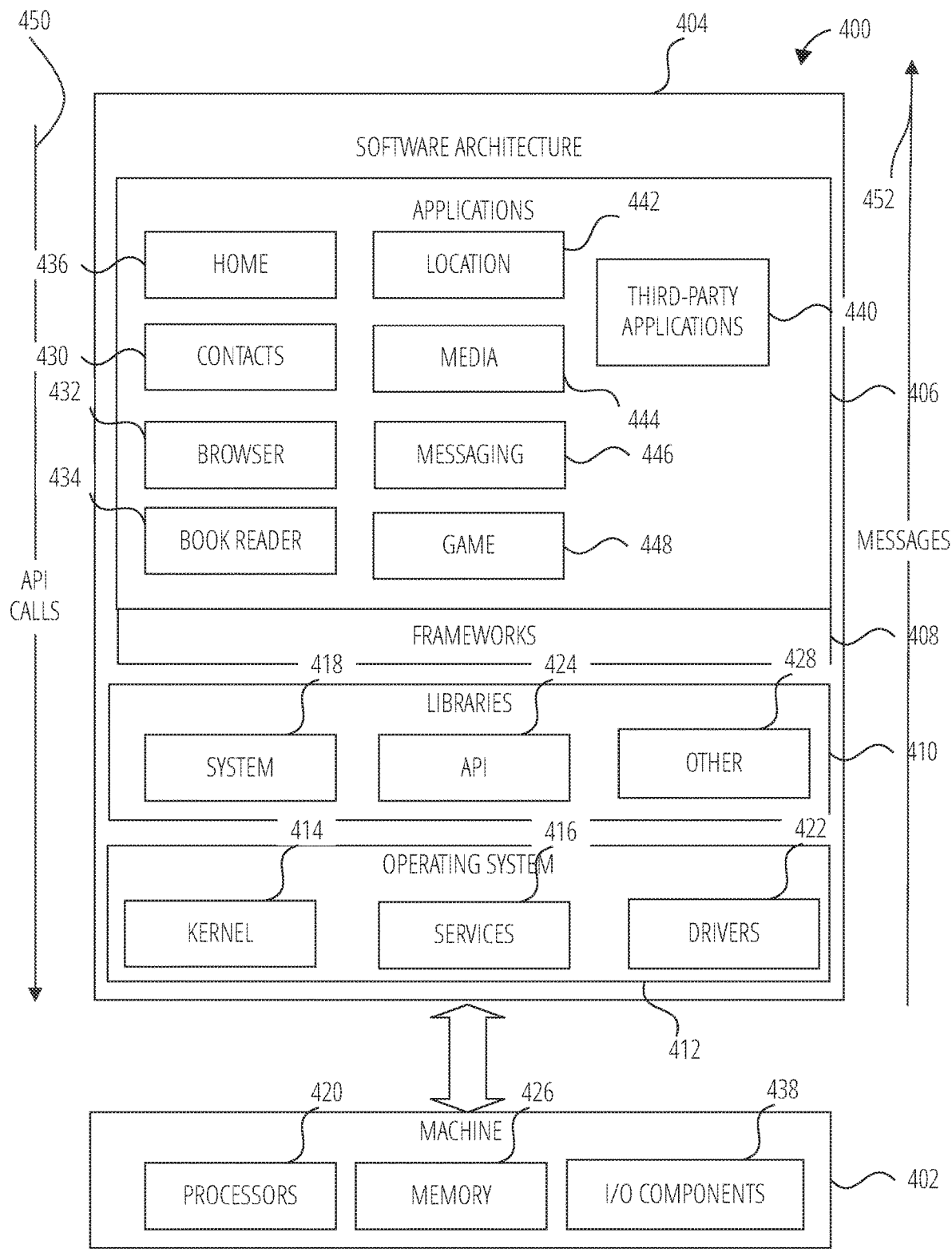
FIG. 4 is block diagram showing a software architecture within which the present disclosure may be implemented, in accordance with some example embodiments.

FIG. 4 is a block diagram 400 illustrating a software architecture 404, which can be installed on any one or more of the devices described herein. The software architecture 404 is supported by hardware such as a machine 402 that includes processors 420, memory 426, and I/O components 438. In this example, the software architecture 404 can be conceptualized as a stack of layers, where each layer provides a particular functionality. The software architecture 404 includes layers such as an operating system 412, libraries 410, frameworks 408, and applications 406. Operationally, the applications 406 invoke API calls 450 through the software stack and receive messages 452 in response to the API calls 450.

The operating system 412 manages hardware resources and provides common services. The operating system 412 includes, for example, a kernel 414, services 416, and drivers 422. The kernel 414 acts as an abstraction layer between the hardware and the other software layers. For example, the kernel 414 provides memory management, processor management (e.g., scheduling), component management, networking, and security settings, among other functionality. The services 416 can provide other common services for the other software layers. The drivers 422 are responsible for controlling or interfacing with the underlying hardware. For instance, the drivers 422 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 410 provide a low-level common infrastructure used by the applications 406. The libraries 410 can include system libraries 418 (e.g., C standard library) that provide functions such as memory allocation functions, string manipulation functions, mathematic functions, and the like. In addition, the libraries 410 can include API libraries 424 such as media libraries (e.g., libraries to support presentation and manipulation of various media formats such as Moving Picture Experts Group-4 (MPEG4), Advanced Video Coding (H.264 or AVC). Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 410 can also include a wide variety of other libraries 428 to provide many other APIs to the applications 406.

The frameworks 408 provide a high-level common infrastructure that is used by the applications 406. For example, the frameworks 408 provide various graphical user interface (GUI) functions, high-level resource management, and high-level location services. The frameworks 408 can provide a broad spectrum of other APIs that can be used by the applications 406, some of which may be specific to a particular operating system or platform.

In an example embodiment, the applications 406 may include a home application 436, a contacts application 430, a browser application 432, a book reader application 434, a location application 442, a media application 444, a messaging application 446, a game application 448, and a broad assortment of other applications such as third-party applications 440. The applications 406 are programs that execute functions defined in the programs. Various programming languages can be employed to create one or more of the applications 406, structured in a variety of manners, such as object-oriented programming languages (e.g., Objective-C, Java, or C++) or procedural programming languages (e.g., C or assembly language). In a specific example, the third-party applications 440 (e.g., applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 440 can invoke the API calls 450 provided by the operating system 412 to facilitate functionality described herein.

Figure 5:
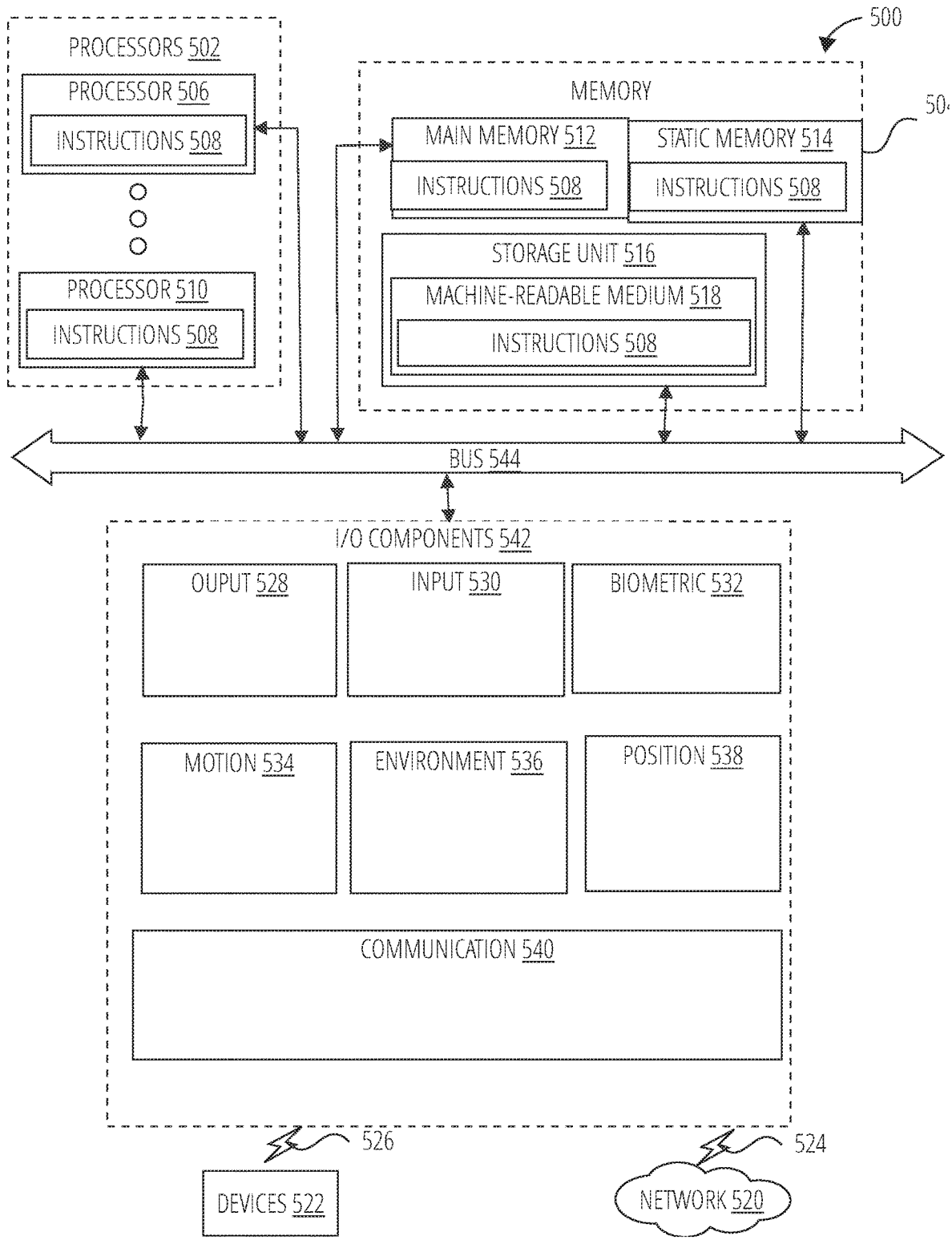
FIG. 5 is a diagrammatic representation of a machine, in the form of a computer system within which a set of instructions may be executed for causing the machine to perform any one or more of the methodologies discussed, in accordance with some example embodiments.

FIG. 5 is a diagrammatic representation of a machine 500 within which instructions 508 (e.g., software, a program, an application, an applet, an app, or other executable code) for causing the machine 500 to perform any one or more of the methodologies discussed herein may be executed. For example, the instructions 508 may cause the machine 500 to execute any one or more of the methods described herein. The instructions 508 transform the general, non-programmed machine 500 into a particular machine 500 programmed to carry out the described and illustrated functions in the manner described. The machine 500 may operate as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 508, sequentially or otherwise, that specify actions to be taken by the machine 500. Further, while only a single machine 500 is illustrated, the term "machine" shall also be taken to include a collection of machines that individually or jointly execute the instructions 508 to perform any one or more of the methodologies discussed herein.

The machine 500 may include processors 502, memory 504, and I/O components 542, which may be configured to communicate with each other via a bus 544. In an example embodiment, the processors 502 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 506 and a processor 510 that execute the instructions 508. The term "processor" is intended to include multi-core processors that may comprise two or more independent processors (sometimes referred to as "cores") that may execute instructions contemporaneously. Although FIG. 5 shows multiple processors 502, the machine 500 may include a single processor with a single core, a single processor with multiple cores (e.g., a multi-core processor), multiple processors with a single core, multiple processors with multiples cores, or any combination thereof.

The memory 504 includes a main memory 512, a static memory 514, and a storage unit 516, both accessible to the processors 502 via the bus 544. The main memory 504, the static memory 514, and storage unit 516 store the instructions 508 embodying any one or more of the methodologies or functions described herein. The instructions 508 may also reside, completely or partially, within the main memory 512, within the static memory 514, within machine-readable medium 518 within the storage unit 516, within at least one of the processors 502 (e.g., within the processor's cache memory), or any suitable combination thereof, during execution thereof by the machine 500.

The I/O components 542 may include a wide variety of components to receive input, provide output, produce output, transmit information, exchange information, capture measurements, and so on. The specific I/O components 542 that are included in a particular machine will depend on the type of machine. For example, portable machines such as mobile phones may include a touch input device or other such input mechanisms, while a headless server machine will likely not include such a touch input device. It will be appreciated that the I/O components 542 may include many other components that are not shown in FIG. 5. In various example embodiments, the I/O components 542 may include output components 528 and input components 530. The output components 528 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 530 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 542 may include biometric components 532, motion components 534, environmental components 536, or position components 538, among a wide array of other components. For example, the biometric components 532 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 534 include acceleration sensor components (e.g., accelerometer), gravitation sensor components, rotation sensor components (e.g., gyroscope), and so forth. The environmental components 536 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 538 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 542 further include communication components 540 operable to couple the machine 500 to a network 520 or devices 522 via a coupling 524 and a coupling 526, respectively. For example, the communication components 540 may include a network interface component or another suitable device to interface with the network 520. In further examples, the communication components 540 may include wired communication components, wireless communication components, cellular communication components. Near Field Communication (NFC) components. Bluetooth® components (e.g., Bluetooth® Low Energy). Wi-Fi® components, and other communication components to provide communication via other modalities. The devices 522 may be another machine or any of a wide variety of peripheral devices (e.g., a peripheral device coupled via a USB).

Moreover, the communication components 540 may detect identifiers or include components operable to detect identifiers. For example, the communication components 540 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 540, such as location via Internet Protocol (IP) geolocation, location via Wi-Fi® signal triangulation, location via detecting an NFC beacon signal that may indicate a particular location, and so forth.

The various memories (e.g., memory 504, main memory 512, static memory 514, and/or memory of the processors 502) and/or storage unit 516 may store one or more sets of instructions and data structures (e.g., software) embodying or used by any one or more of the methodologies or functions described herein. These instructions (e.g., the instructions 508), when executed by processors 502, cause various operations to implement the disclosed embodiments.

The instructions 508 may be transmitted or received over the network 520, using a transmission medium, via a network interface device (e.g., a network interface component included in the communication components 540) and using any one of a number of well-known transfer protocols (e.g., hypertext transfer protocol (HTTP)). Similarly, the instructions 508 may be transmitted or received using a transmission medium via the coupling 526 (e.g., a peer-to-peer coupling) to the devices 522.

Figure 6:
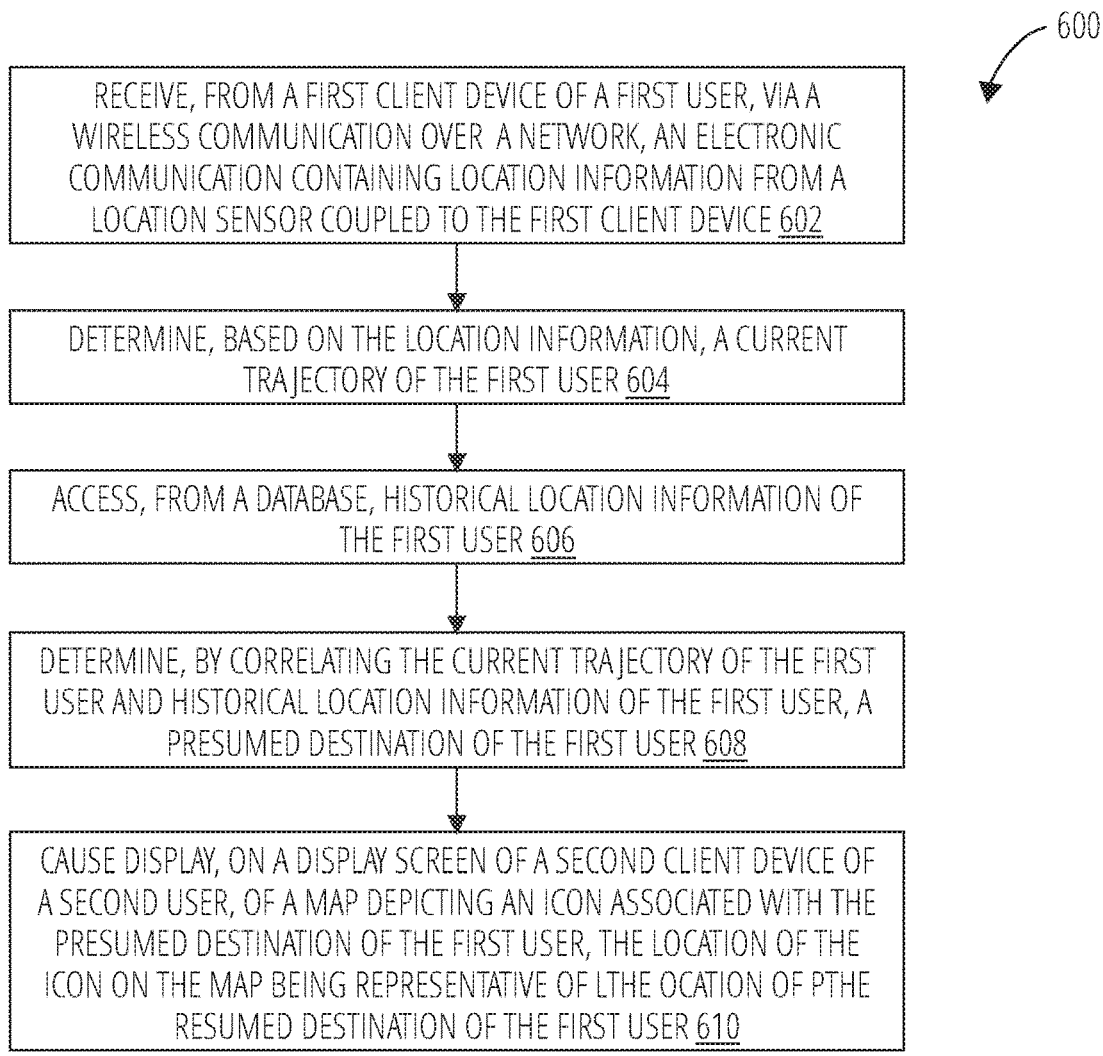
FIG. 6 illustrates a method in accordance with one embodiment.

FIG. 6 is a flowchart illustrating a method 600 for generating and presenting various interfaces to display an icon associated with the presumed destination of a first user on a display screen of a client device of a second user. The method 300 may be embodied in computer-readable instructions for execution by one or more processors (e.g., processor 302) such that the steps of the method 600 may be performed in part or in whole by functional components (e.g., location component 308, map GUI component 310, prediction component 312) of a processing environment 300 of a system (e.g., social network system 122); accordingly, the method 600 is described below by way of example with reference thereto. However, the method 600 may be deployed on various other hardware configurations and is not intended to be limited to the functional components of the processing environment 300.

In some embodiments, the system may need to receive authorization from a first user to utilize location information from a first client device of the first user (e.g., client device 102) and/or to display the first user's avatar or location on a display screen of a second client device associated with a second user prior to performing the remaining steps of method 700. Such authorization may be obtained via acceptance of a terms of service for utilizing an online social network or other service provided by the system, by acceptance on a case-by-case basis by the first user (e.g., via popups displayed on the user's computing device) or using any other suitable method for obtaining authorization by the user(s).

In operation 602, the system receives, from a first client device (e.g., client device 102) associated with a first user, via a wireless communication, over a network (e.g., network 106), an electronic communication containing location information from a location sensor (e.g., position components 538) coupled to the first client device. In some embodiments, the location sensor may include a global positioning sensor (GPS) component integrated in the first client device, as well as other types of location sensors.

The system may receive location information on a periodic basis or on an irregular basis and may request information from the first user's client device or receive such information from the first user's client device without such a request. In one embodiment, for instance, the first user's client device contains software that monitors the location sensor information from the first user's client device and transmits updates to the system in response to the location changing. In some cases, the first user's client device may update the system with a new location only after the location changes by at least a predetermined distance to allow a user to move about a building or other location without triggering updates.

In operation 604, the system determines, based on the location information, a current trajectory of the first user. A trajectory is a consecutive sequence of points in geographical space (e.g., GPS points) in chronological order, each point being defined by at least a set of geographical coordinates and a time stamp. The current trajectory of the first user may be generated by consolidating instant location information collected over time from one or more client devices (e.g., client device 102) associated with the first user. The system may use any number of different location measurements to determine a user's current trajectory. In some embodiments, for example, the system may determine a speed of the first user's client device (e.g., in real-time or near-real-time) based on first location information from the location sensor on the first user's device at a first time, and second location information from the location sensor at a second (subsequent) time. The speed and location information can be analyzed together to help determine the first user's current trajectory. Other information can be used to determine the first user's current trajectory. For example, if a mode of transportation (car, train, etc) of the user has been identified, the current trajectory can be determined by mapping the location information to infrastructure elements (road, railroad, etc) or other map elements.

In operation 606, the system accesses, from a database (e.g., entity table 206), information regarding the first user. The information may include habitual places of the user, which are places where the user spends a significant amount of time, such as home, work or school. Habitual places of a user may be inferred by analyzing the historical location information of the user. Habitual places of a user may be associated with a category such as "home", "work", "school". For example, the place where the user spends most of his time during the day may be identified as the user's work place or school. The place where the user spends most of his time during the night may be identified as the user's domicile. The user may also identify his/her habitual places.

In operation 608, the system determines, by correlating the current trajectory of the first user and the historical location information of the first user, a presumed destination of the first user. The system may select candidate destination from among the habitual places of the first user, and compute, for each candidate destination, a probability that the candidate destination is the destination of the user. In particular, the system may compute this probability based on one or more of the following: a distance trend representative of how fast the first user is getting closer to a candidate destination, a probability that the first user will be in the candidate destination within a preset amount of time, a conditional probability that the first user will stay at least a preset amount of time at the candidate destination; and a score representative of how the behavior of the user matches his habitual behavior. Based on the computed probability exceeding a preset threshold, the system may determine that the candidate destination is the presumed destination of the first user.

Figure 7:
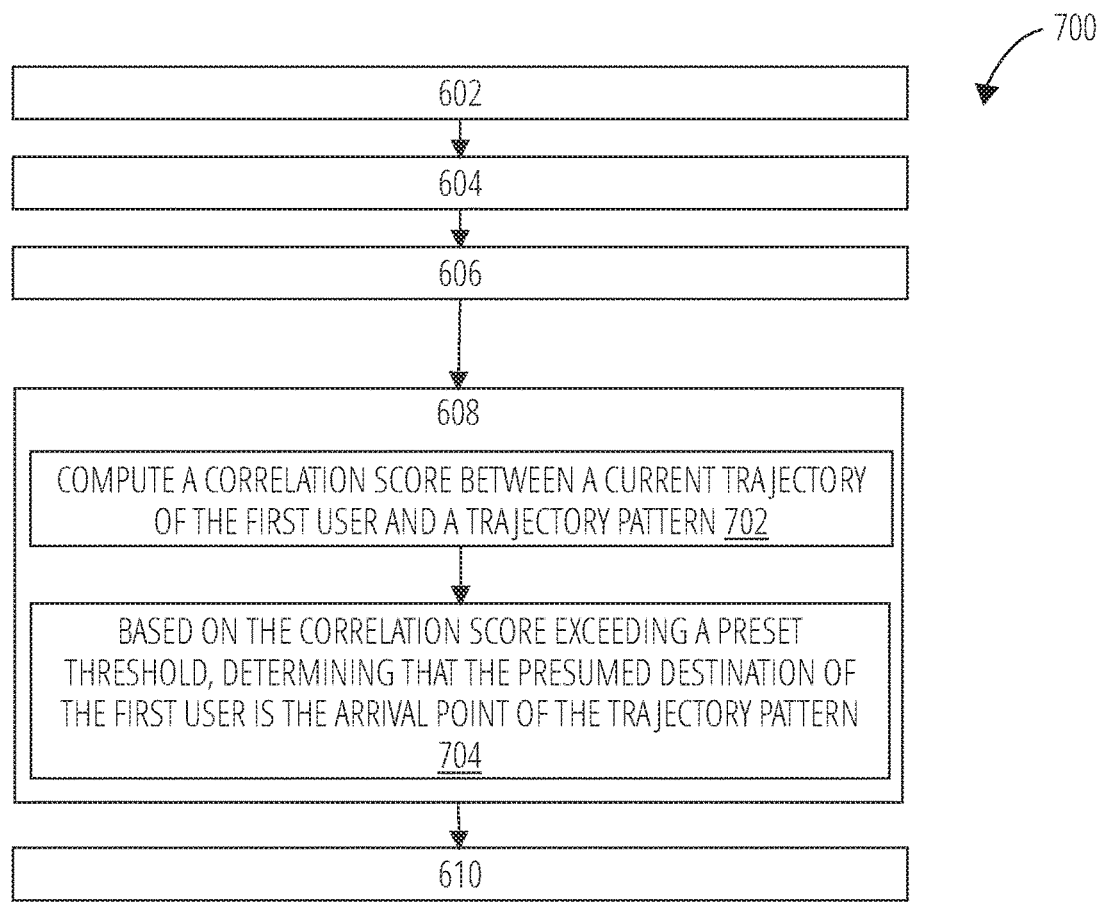
FIG. 7 illustrates a method in accordance with one embodiment.

As described in reference to FIG. 7, the system may also compute a correlation score between the current trajectory of the first user and a candidate trajectory pattern, and, based on the correlation score exceeding a preset threshold, determining that the presumed destination of the first user is the arrival point of the candidate trajectory pattern.

In operation 610, method 600 causes display, on a display screen of a second client device of a second user, of a user interface (e.g., user interface 1100 of FIG. 11) including a map depicting an icon associated with the habitual place of the first user that has been identified as the presumed destination of the first user. The location of the icon on the map is representative of the location of the presumed destination.

The system may compute, as new location information is received for the first user, an updated probability that the presumed destination is the actual destination of the first user. If the updated probability falls below a second preset threshold, the system may determine that the presumed destination is not the actual destination of the first user. In this case, the system may interrupt the display of the presumed destination of the first user on the second client device.

As shown in FIG. 7, method 700 may include the operations of method 600 as well as operation 702 and operation 704, according to some embodiments. Consistent with some embodiments, block operation 702 and operation 704 may be performed as part of (e.g., as sub-operations or as a subroutine) operation 608.

In embodiments, the historical location information includes one or more trajectory patterns of the user. A trajectory pattern corresponds to a recurring route that the user follows on a regular basis. A trajectory pattern may be defined by a plurality of location points (e.g., GPS points) in chronological order from a starting point to an arrival point. Exemplary methods for extracting trajectory patterns from historical location information are discussed in reference to FIG. 8.

In operation 702, method 700 computes a correlation score between the current trajectory of the first user and one or more of the trajectory patterns. Operation 702 may be triggered based on detecting that the current location of the first user is inside or within a preset distance of one of the trajectory patterns. In operation 704, based on the correlation score between the current trajectory and one of the trajectory patterns exceeding a preset threshold, the system selects the arrival point of the trajectory pattern as the presumed destination of the first user.

Figure 8:
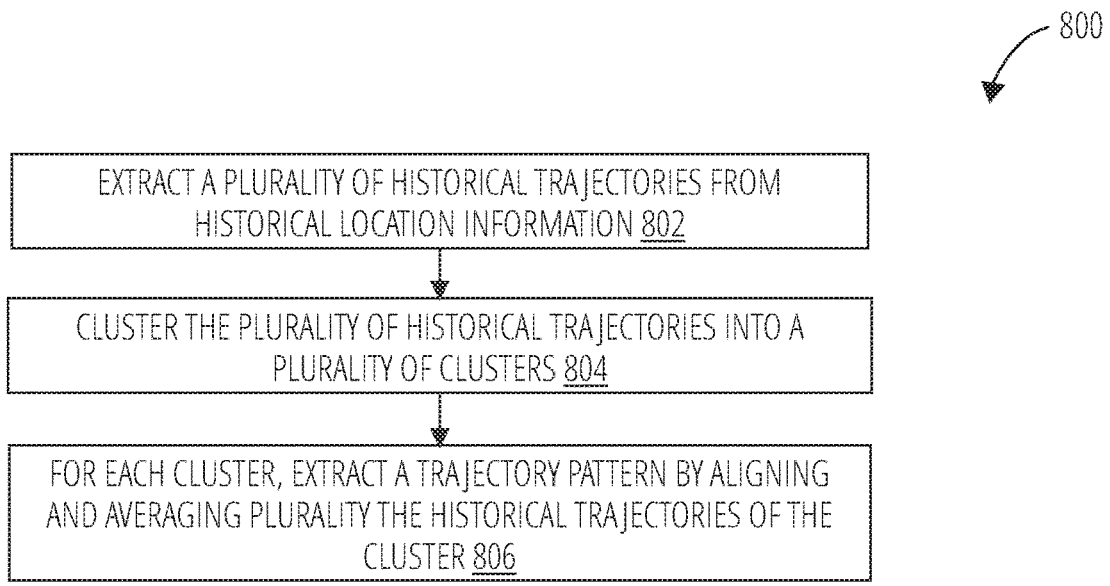
FIG. 8 illustrates a method in accordance with one embodiment.

FIG. 8 is a flowchart illustrating a method 800 for extracting trajectory patterns from historical location information. The method 800 may be embodied in computer-readable instructions for execution by one or more processors (e.g., processor 302) such that the steps of the method 800 may be performed in part or in whole by functional components (e.g., map GUI component 310, prediction component 312) of a processing environment 300 of a system (e.g., social network system 122); accordingly, the method 800 is described below by way of example with reference thereto. However, it shall be appreciated that the method 800 may be deployed on various other hardware configurations and is not intended to be limited to the functional components of the processing environment 300.

Consistent with some embodiments, method 800 may be performed as part of (e.g., as sub-operations or as a subroutine) operation 608.

In operation 802, the system extracts a plurality of historical trajectories from the historical location information. A historical trajectory is a consecutive sequence of points in geographical space (e.g., GPS points) in chronological order, each point being defined by at least a set of geographical coordinates and a time stamp. The sequence of points includes a start point and an end point. The start point, and the end point may be selected based on being in the neighborhood (e.g., within a preset distance) of a respective habitual place of the user. An historical trajectory may be generated from the historical location information by consolidating location information collected over a period of time spanning from the timestamp of the start point to the timestamp of the end point.

In operation 804, the system clusters the plurality of historical trajectories into a plurality of clusters. The plurality of historical trajectories is allocated into cohesive groups according to their mutual similarities. A variety of distance functions may be used to measure the similarity between historical trajectories (e.g., Euclidean Distance, Hausdorff Distance, Dynamic Time Warping (DTW) Distance, Longest Common Subsequence (LCSS) Distance). A variety of trajectory clustering methods may be used, including methods based on unsupervised, supervised and semi-supervised algorithms. A variety of models may be used including Densely Clustering models. Hierarchical Clustering models and Spectral Clustering models.

In operation 806, for each cluster, the system extracts a trajectory pattern by aligning and averaging the plurality of historical trajectories of the cluster. The plurality of historical trajectories of the cluster may be aligned in time and space using a variety of multiple sequence alignment techniques, such as progressive alignment construction methods, iterative methods, or consensus methods. Averaging the historical trajectories of a cluster is the problem of finding an average sequence for a set of sequences. The average sequence may be defined as the sequence that minimizes the sum of the squares to the set of objects. Various techniques may be used to average a set of sequences, such as bucketization techniques or Dynamic time warping. For each trajectory pattern, the system may also extract characteristics such as an average duration, a schedule, and a mode of transport. In particular, the mode of transport may be inferred based on mapping the trajectory pattern to infrastructure elements, such as roads, railroads.

Figure 9:
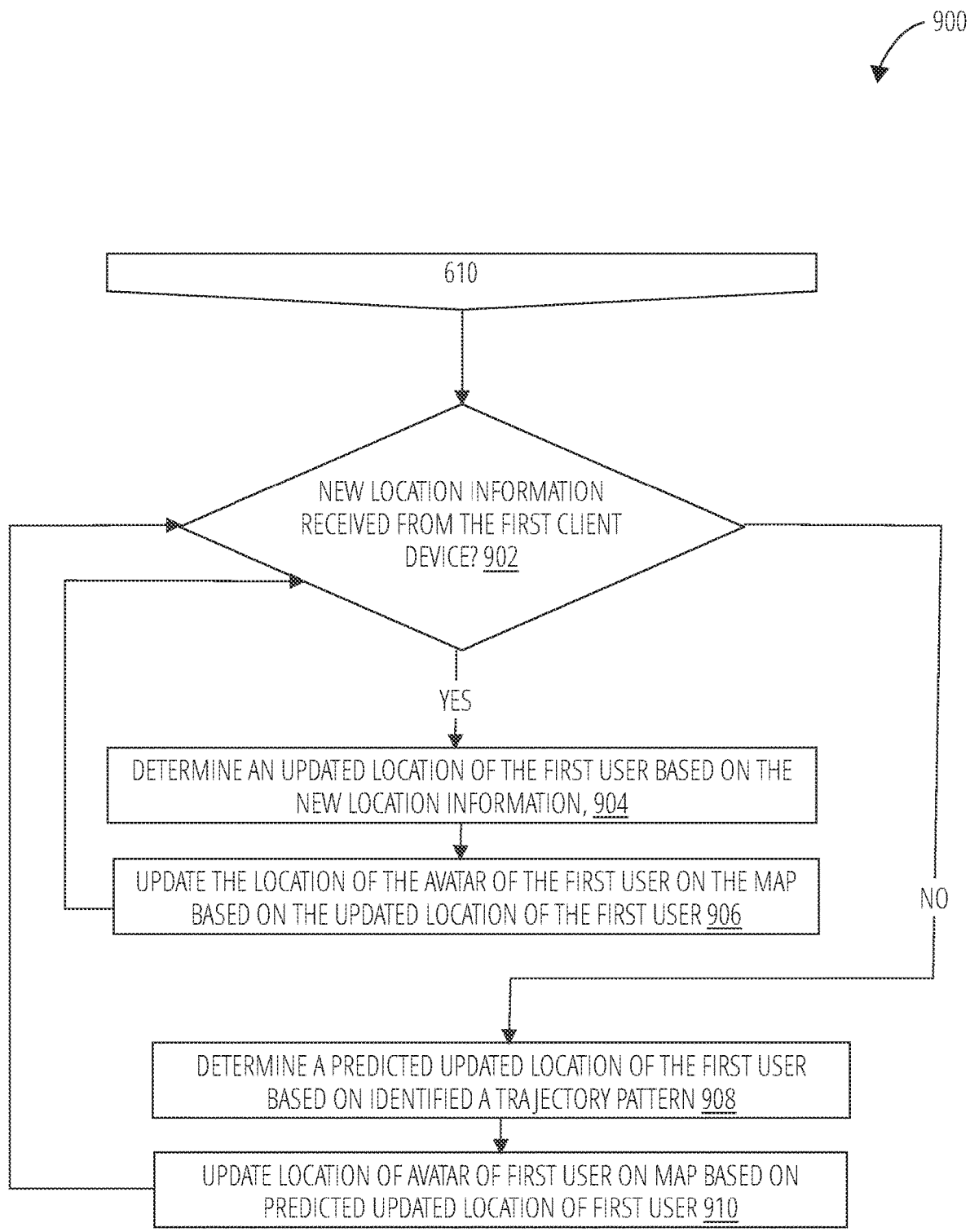
FIG. 9 illustrates a method in accordance with one embodiment.

In embodiments, the identified trajectory pattern may be used to extrapolate the current location of the first user based on the current trajectory of the user, for example in cases where the communication with the client device is lost. As shown in FIG. 9, method 900 may include the operations of method 700 as well as decision operation 902, operation 904, operation 906, operation 908, and operation 910, according to some embodiments. Consistent with some embodiments, decision operation 902, operation 904, operation 906, operation 908, and operation 910 may be performed after operation 610.

In decision operation 902, the system determines whether new location information has been received from the first client device.

If new location information has been received from the first client device, the system determines, in operation 904, an updated location of the first user based on the new location information. In operation 906, the system updates the location of the avatar of the first user on the map based on the updated location of the first user.

If no electronic communication has been received from the first client device for a period exceeding a preset period of time, the system determines, in operation 908, a predicted updated location of the first user based on the assumption that the user is following the trajectory pattern identified at operation 704. The system may for example predict the updated location of the first user by projecting the current location of the first user on the identified trajectory pattern based on the time elapsed since the last time location information has been received from the first client device. In operation 910, the system updates the location of the avatar of the first user on the map based on the predicted updated location of the first user.

In embodiments, the identified trajectory pattern may be used to infer the current mode of transport of the first user. This information can be used to predict a delay associated with the mode of transport of the first user. For example, the system infers that the first user in on a particular train, the system can access schedule and delay information of the particular train to more precisely predict a time of arrival of the first user.

Figure 10:
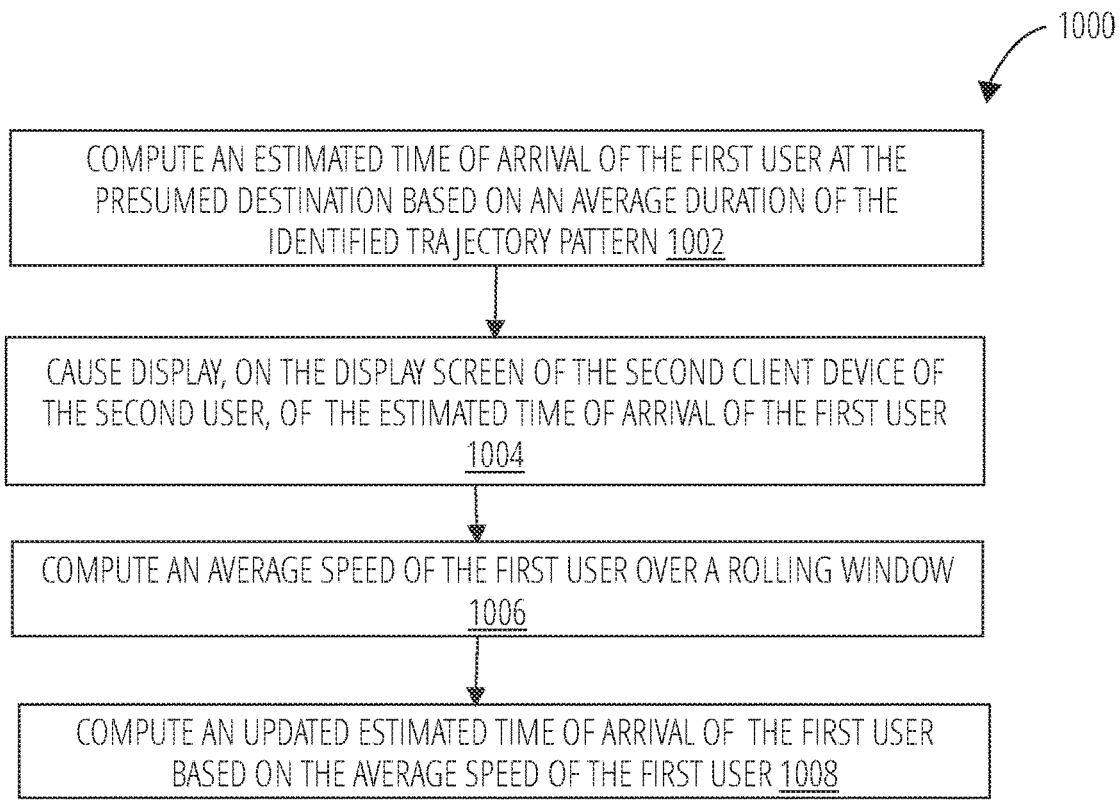
FIG. 10 illustrates a method in accordance with one embodiment.

In embodiments, the social network system 122 may compute an estimated time of arrival of the first user at the presumed destination and display the estimated time of arrival on the map GUI. As shown in FIG. 10, method 1000 may include the blocks of method 700 as well as operation 1002, operation 1004, operation 1006, and operation 1008, according to some embodiments. Consistent with some embodiments, operation 1002, operation 1004, operation 1006, and operation 1008 are be performed after operation 608.

In operation 1002, the system computes an estimated time of arrival of the first user at the presumed destination based the average duration of the trajectory pattern identified at operation 704. The system may also consider other factors such as weather, traffic conditions, and public transport schedule. In operation 1006, the system displays, on the display screen of the second client device of the second user, of the estimated time of arrival of the first user. In operation 1006, the system computes an average speed of the first user. For example, the system may determine an average speed of the first user's client device based on location information subsequently received from the location sensor of the first user's device over a rolling window. In operation 1008, the system updates the estimated time of arrival of the first user based on the average speed of the first user.

Figure 11:
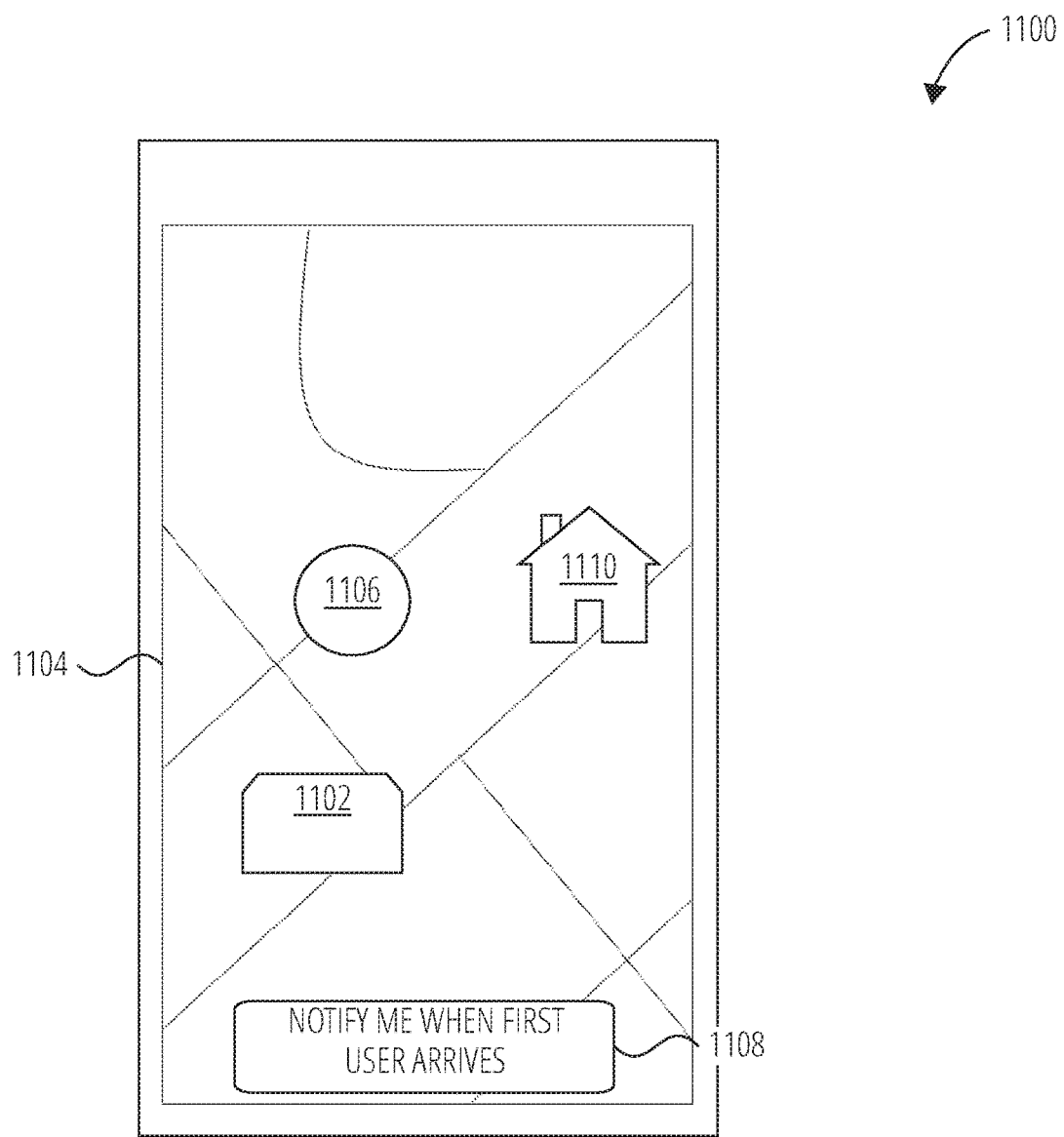
FIG. 11 illustrates a user interface displayed on a client device in accordance with one embodiment.

As shown in FIG. 11, exemplary user interface 1100 includes a map GUI 1104 depicting the first user's avatar 1106. The avatar 1106 is a media content item associated with the first user and that may include a still image, animated image, video, or other content. In particular, the avatar 1106 may include a profile picture of the first user or a default icon.

The location of the first user's avatar 1106 on the map GUI 1104 is representative of the current location of the first user. The system updates the location of the first user's avatar 1106 on the map GUI 1104 as the location of the client device of the first user changes. The first user's avatar 1106 may be a selectable UI element triggering the display of a user interface (e.g., user interface 1200 of FIG. 12) including map view centered on the selected avatar.

If a habitual place of the first user has been identified as the presumed destination of the first user, the map GUI 1104 includes an icon 1110 associated with the habitual place the first user is heading to. The icon 1110 is a media content item associated with the habitual place of the user and that may include a still image, animated image, video, or other content. The icon 1110 of a habitual place may be based on information (e.g., a category) stored in relation with the habitual place. The information may be retrieved from a variety of sources, such as form the entity table as well as from other systems and devices. For example, if the habitual place is identified as the home of the user, the icon 1110 may be an image depicting a house. The location of the icon 1110 on the map GUI 1104 is representative of the location of the presumed destination. If the current trajectory of the user has been matched to a pattern trajectory, the map GUI 1104 may also include an illustration of the pattern trajectory. The map GUI 1104 may also include an icon 1102 associated with the starting point of the pattern trajectory. The user interface 1100 may also include a selectable user interface element 1108 for requesting to be notified when the first user reaches his/her presumed destination.

Figure 12:
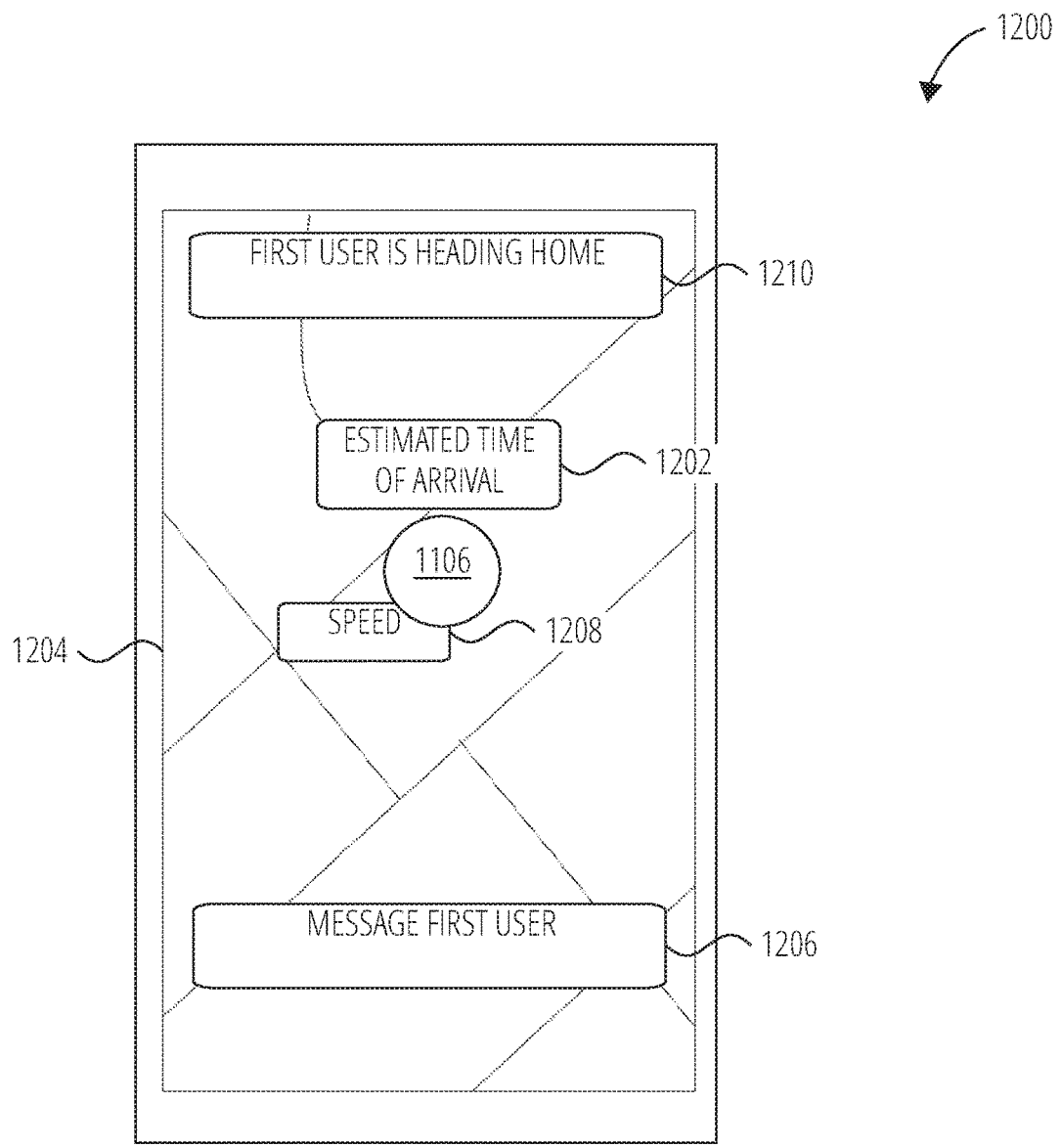
FIG. 12 illustrates a user interface displayed on a client device in accordance with one embodiment.

As shown in FIG. 12, exemplary user interface 1200 includes a map GUI 1204 centered around the first user's avatar 1106. The user interface 1200 includes an indication 1210 of the destination of the first user. The user interface 1200 may also include an indication 1202 of the estimated time of arrival of the first user at the presumed destination, and optionally an instantaneous speed 1208 of the first user. The user interface 1200 may also include a selectable UI element 1206 to send a message or share media content with the first user (e.g., via the online social network, text message, or other electronic communication).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

"Signal Medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"Communication Network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Processor" refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"Machine-Storage Medium" refers to a single or multiple storage devices and/or media (e.g., a centralized or distributed database, and/or associated caches and servers) that store executable instructions, routines and/or data. The term shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices. e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Carrier Signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Computer-Readable Medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Client Device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

What is claimed is:

1. A method comprising:

receiving, at a server computer, from a first client device of a first user, via a wireless communication over a network, an electronic communication containing location information from a location sensor coupled to the first client device;

determining, based on the location information, a current trajectory of the first user;

accessing, from a database coupled to the server computer, historical location information of the first user, the historical information including a plurality of historical trajectories, each historical trajectory corresponding to a respective consecutive sequence of points, each point defined by a set of geographical coordinates and a time stamp;

clustering the plurality of historical trajectories into a plurality of clusters;

determining, based on the current trajectory of the first user and the plurality of clusters, a presumed destination of the first user; and initiating transmission of destination data to a second client device, the destination data comprising the presumed destination of the first user for display, on a display screen of the second client device of a second user, of a user interface including a map depicting an icon associated with the presumed destination of the first user and a location of the icon on the map representative of the location of the presumed destination of the first user, wherein the map further depicts an avatar of the first user, a position of the avatar of the first user on the map corresponding to a current location of the first user, wherein the user interface further includes a user-selectable element for composing a message for sending to the first user or for sharing a media content item with the first user, and wherein the user interface further displays a current speed of the first user and an estimated time of arrival of the first user at the presumed destination.

2. The method of claim 1, further comprising:
extracting, for each cluster, a trajectory pattern by aligning and averaging the plurality of historical trajectories of the cluster, the trajectory pattern being associated with an arrival point.

3. The method of claim 2, wherein determining the presumed destination of the first user comprises:
computing, for each trajectory pattern, a correlation score between the current trajectory of the first user and the trajectory pattern; and
determining, based on the correlation score exceeding a preset threshold for one of the trajectory patterns, that the presumed destination of the first user is the arrival point of the one of the trajectory patterns.

4. The method of claim 1, further comprising:
receiving, from the first client device of the first user, a second electronic communication, the second electronic communication containing new location information from the location sensor coupled to the first client device;
determining an updated location of the first user based on the new location information; and
updating the location of the avatar of the first user on the map based on the updated location of the first user.

5. The method of claim 2, wherein the trajectory pattern is associated with an average duration, the method further comprising:
computing an estimated time of arrival of the first user at the presumed destination based on the average duration of the trajectory pattern; and
causing display, on the display screen of the second client device of the second user, of the estimated time of arrival.

6. The method of claim 5, further comprising:
computing an average speed of the first user, wherein the estimated time of arrival of the first user is further computed based on the average speed of the first user.

7. The method of claim 1, further comprising:
determining that a preset period of time has passed since receiving the first electronic communication without having received a second electronic communication from the first client device;
determining, in response to determining that the preset period of time has passed, a first updated location of the first user based on the location information and the historical location information; and
updating the location of the avatar of the first user on the map based on the first updated location of the first user.

8. The method of claim 1, wherein the user interface further includes a first user-selectable element for sending a request to be notified when the first user reaches the presumed destination.

9. A system comprising:
a processor; and
a memory storing instructions that, when executed by the processor, configure the system to perform operations comprising:
receiving, from a first client device of a first user, via a wireless communication over a network, an electronic communication containing location information from a location sensor coupled to the first client device;
determining, based on the location information, a current trajectory of the first user;
accessing, from a database, historical location information of the first user, the historical information including a plurality of historical trajectories, each historical trajectory corresponding to a respective consecutive sequence of points, each point defined by a set of geographical coordinates and a time stamp;
clustering the plurality of historical trajectories into a plurality of clusters;
determining, based on the current trajectory of the first user and the plurality of clusters, a presumed destination of the first user; and
initiating transmission of destination data to a second client device, the destination data comprising the presumed destination of the first user for display, on a display screen of the second client device of a second user, of a user interface including a map depicting an icon associated with the presumed destination of the first user and a location of the icon on the map representative of the location of the presumed destination of the first user,
wherein the map further depicts an avatar of the first user, a position of the avatar of the first user on the map corresponding to a current location of the first user,
wherein the user interface further includes a user-selectable element for composing a message for sending to the first user or for sharing a media content item with the first user, and wherein the user interface further displays a current speed of the first user and an estimated time of arrival of the first user at the presumed destination.

10. The system of claim 9, further comprising:
extracting, for each cluster, a trajectory pattern by aligning and averaging the plurality of historical trajectories of the cluster, the trajectory pattern being associated with an arrival point.

11. The system of claim 10, wherein determining the presumed destination of the first user comprises:
computing, for each trajectory pattern, a correlation score between the current trajectory of the first user and the trajectory pattern; and
determining, based on the correlation score exceeding a preset threshold for one of the trajectory patterns, that the presumed destination of the first user is the arrival point of the one of the trajectory patterns.

12. The system of claim 9, the operations further comprising:
receiving, from the first client device of the first user, a second electronic communication, the second electronic communication containing new location information from the location sensor coupled to the first client device;
determining an updated location of the first user based on the new location information; and
updating the location of the avatar of the first user on the map based on the updated location of the first user.

13. The system of claim 10, wherein the trajectory pattern is associated with an average duration, and wherein the operations further comprise:
computing an estimated time of arrival of the first user at the presumed destination based on the average duration of the trajectory pattern; and
causing display, on the display screen of the second client device of the second user, of the estimated time of arrival.

14. The system of claim 13, the operations further comprising:
computing an average speed of the first user,
wherein the estimated time of arrival of the first user is further computed based on the average speed of the first user.

15. A non-transitory computer-readable storage medium, the computer-readable storage medium including instructions that when executed by a processor, cause the processor to perform operations comprising:

receiving, from a first client device of a first user, via a wireless communication over a network, an electronic communication containing location information from a location sensor coupled to the first client device;

determining, based on the location information, a current trajectory of the first user;

accessing, from a database, historical location information of the first user, the historical information including a plurality of historical trajectories, each historical trajectory corresponding to a respective consecutive sequence of points, each point defined by a set of geographical coordinates and a time stamp;

clustering the plurality of historical trajectories into a plurality of clusters;

determining, based on the current trajectory of the first user and the plurality of clusters, a presumed destination of the first user; and initiating transmission of destination data to a second client device, the destination data comprising the presumed destination of the first user for display, on a display screen of the second client device of a second user, of a user interface including a map depicting an icon associated with the presumed destination of the first user and a location of the icon on the map representative of the location of the presumed destination of the first user, wherein the map further depicts an avatar of the first user, a position of the avatar of the first user on the map corresponding to a current location of the first user, wherein the user interface further includes a user-selectable element for composing a message for sending to the first user or for sharing a media content item with the first user, and wherein the user interface further displays a current speed of the first user and an estimated time of arrival of the first user at the presumed destination.

16. The medium of claim 15, wherein the map further depicts an avatar of the user, a position of the avatar of the user on the map corresponding to a current location of the user.

* * * * *